(12) United States Patent
Adl-Tabatabai et al.

(10) Patent No.: US 7,512,930 B2
(45) Date of Patent: Mar. 31, 2009

(54) PROGRAM OBJECT READ BARRIER

(75) Inventors: Ali-Reza Adl-Tabatabai, Santa Clara, CA (US); Jayashankar Bharadwaj, Saratoga, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 10/815,397

(22) Filed: Mar. 31, 2004

(65) Prior Publication Data
US 2005/0235006 A1    Oct. 20, 2005

(51) Int. Cl.
G06F 9/44 (2006.01)
G06F 9/45 (2006.01)
G06F 15/00 (2006.01)

(52) U.S. Cl. .................. 717/104; 717/140; 712/220
(58) Field of Classification Search .......... 717/104, 717/140; 712/220
See application file for complete search history.

(56) References Cited

U.S. PATENT DOCUMENTS

| | | | | |
|---|---|---|---|---|
| 5,390,310 | A * | 2/1995 | Welland | 711/203 |
| 6,880,073 | B2 * | 4/2005 | Arimilli et al. | 712/245 |
| 2004/0268095 | A1 * | 12/2004 | Shpeisman et al. | 712/225 |
| 2005/0149588 | A1 * | 7/2005 | Bacon et al. | 707/206 |

OTHER PUBLICATIONS

Bacon et al., "A real-time garbage collector with low overhead and consistent utilization", Jan. 2003, ACM SIGPLAN Notices, Proceedings of the 30th ACM SIGPLAN-SIGACT symposium on Principles of programming languages POPL '03, vol. 38 Issue 1, pp. 285-298.*

David F. Bacon, Perry Cheng, V. T. Rajan, "Controlling fragmentation and space consumption in the metronome, a real-time garbage collector for Java", Jun. 2003, ACM SIGPLAN Notices, Proceedings of the 2003 ACM SIGPLAN conference on Language, compiler, and tool for embedded systems LCTES '03, vol. 38 Issue 7, pp. 81-92.*

Intel, "Intel Itanium Architecture Software Developer's Manual", *vol. 3 Insructions Set Reference, Rev, 2.1.* (Oct. 2002), 3 pages.

Intel "The StarJIT Compiler: A Dynamic Compiler for Managed Runtime Environments", *Intel Technology Journal*, vol. 7, Issue 1, ISSN 1535-766X, (Feb. 19, 2003), Cover, 19-31, Back Cover.

Kawahito, Motohiro, et al., "Effective Null Pointer Check Elimination Utilizing Hardware Trap", *IBM Tokyo Research Laboratory, ASPLOS 2000,* (Nov. 15, 2000), 139-149.

USPTO, "42P16435 FOA Mailed Mar. 19, 2007 for U.S. Appl. No. 10/611,283", (Mar. 19, 2007), Whole Document.

USPTO, "42P16435 FOA Mailed Jun. 28, 2006 for U.S. Appl. No. 10/611,283", (Jul. 28, 2006), Whole Document.

USPTO, "42P16435 OA Mailed Nov. 27, 2006 for U.S. Appl. No. 10/611,283", (Nov. 27, 2006), Whole Document.

USPTO, "42P16435 OA Mailed Feb. 13, 2006 for U.S. Appl. No. 10/611,283", (Feb. 13, 2006), Whole Document.

* cited by examiner

Primary Examiner—Wei Y. Zhen
Assistant Examiner—Philip R. Wang
(74) Attorney, Agent, or Firm—Blakely, Sokoloff, Taylor & Zafman LLP

(57) ABSTRACT

A method and apparatus for a read barrier mechanism are described. According to an embodiment, a method comprises receiving an access request for a program object; performing a combined check for a null reference or for a read barrier for the program object; and if the combined check is affirmative, performing a recovery operation.

23 Claims, 6 Drawing Sheets

305   // load p.x

310   I1:    t = add p, *offset(x)*
315   I2:    v = ld.s [t]
      . . .
320   I3:    chk.s v, RecoveryCode
325   NextInst:
      . . .

330   RecoveryCode:
335   I4:    (p1, p2) = tbit.nz t, 0
340   I5:    (p1) t = sub t, 1
345   I6:    (p1) *read-barrier(t)*
350   I7:    v = ld [t]
355   I8:    br NextInst

Figure 3

| | | |
|---|---|---|
| 405 | // load p.x | |
| 410 | I1: | t = add p, *offset(x)* |
| 415 | I2: | v = ld.s [t] |
| | ... | |
| 420 | I3: chk.s v, RecoveryCode | |
| 425 | NextInst: | |
| | ... | |
| 430 | RecoveryCode: | |
| 435 | I4: | (p1, p2) = cmp.eq t, *offset(x)* |
| 440 | I5: | (p1) br RaiseNullPointerException |
| 445 | I6: | (p3, p4) = tbit.nz t, 0 |
| 450 | I7: | (p3) t = sub t, 1 |
| 455 | I8: | (p3) *read-barrier(t)* |
| 460 | I9: | v = ld [t] |
| 465 | I10: | br NextInst |

Figure 4

| | | |
|---|---|---|
| 505 | // load p.x, *offset(x)* is odd | |
| 510 | I1: | t = add p, *offset(x)* - 1 |
| 515 | I2: | v' = ld2.s [t] |
| 520 | I3: | v = shr v', 8 |
| | . . . | |
| 525 | I4: | chk.s v, RecoveryCode |
| 530 | NextInst: | |
| | . . . | |
| 535 | RecoveryCode: | |
| 540 | I5: | (p3, p4) = tbit.nz t, 0 |
| 545 | I6: | (p3) *read-barrier(t)* |
| 550 | I7: | v = ld1 [t] |
| 555 | I8: | br NextInst |

Figure 5

PROGRAM OBJECT READ BARRIER

FIELD

An embodiment of the invention relates to computer operations in general, and more specifically to a program object read barrier.

BACKGROUND

In computer software, a read barrier mechanism may exist for a program object. In this type of operation, the program object is said to be guarded, and any read access to the program object is then trapped or detected.

A read barrier may have many applications in software, including: (1) A read barrier may be used to mediate access to proxies that represent remote objects in distributed object systems. Similarly, read barriers may be used to mediate accesses to persistent objects in persistent object systems. (2) A read barrier may be used to trap accesses to objects that are being garbage collected in runtimes that employ concurrent garbage collection. (3) A read barrier may be used to track references across memory heap regions in runtimes that partition the heap into regions. This may include generational garbage collectors, which partition a heap into generations. (4) A read barrier may be used to implement debug watch points.

If a read barrier has been implemented for a program object, a runtime environment checks each read access to determine whether the access touches a guarded object. However, the process of providing a read barrier may have negative effects on performance. The requirement to provide a check of each read access to determine whether the access is directed to a guarded object may consume considerable computer resources, and thus may impose costs for system operations.

BRIEF DESCRIPTION OF THE DRAWINGS

The invention may be best understood by referring to the following description and accompanying drawings that are used to illustrate embodiments of the invention. In the drawings:

FIG. 3 illustrates an embodiment of a read barrier check using control speculation;

FIG. 4 illustrates an embodiment of a combination of a null pointer check and a read barrier check using control speculation;

FIG. 5 illustrates an embodiment of a read barrier for a single-byte access.

DETAILED DESCRIPTION

Figure 1:
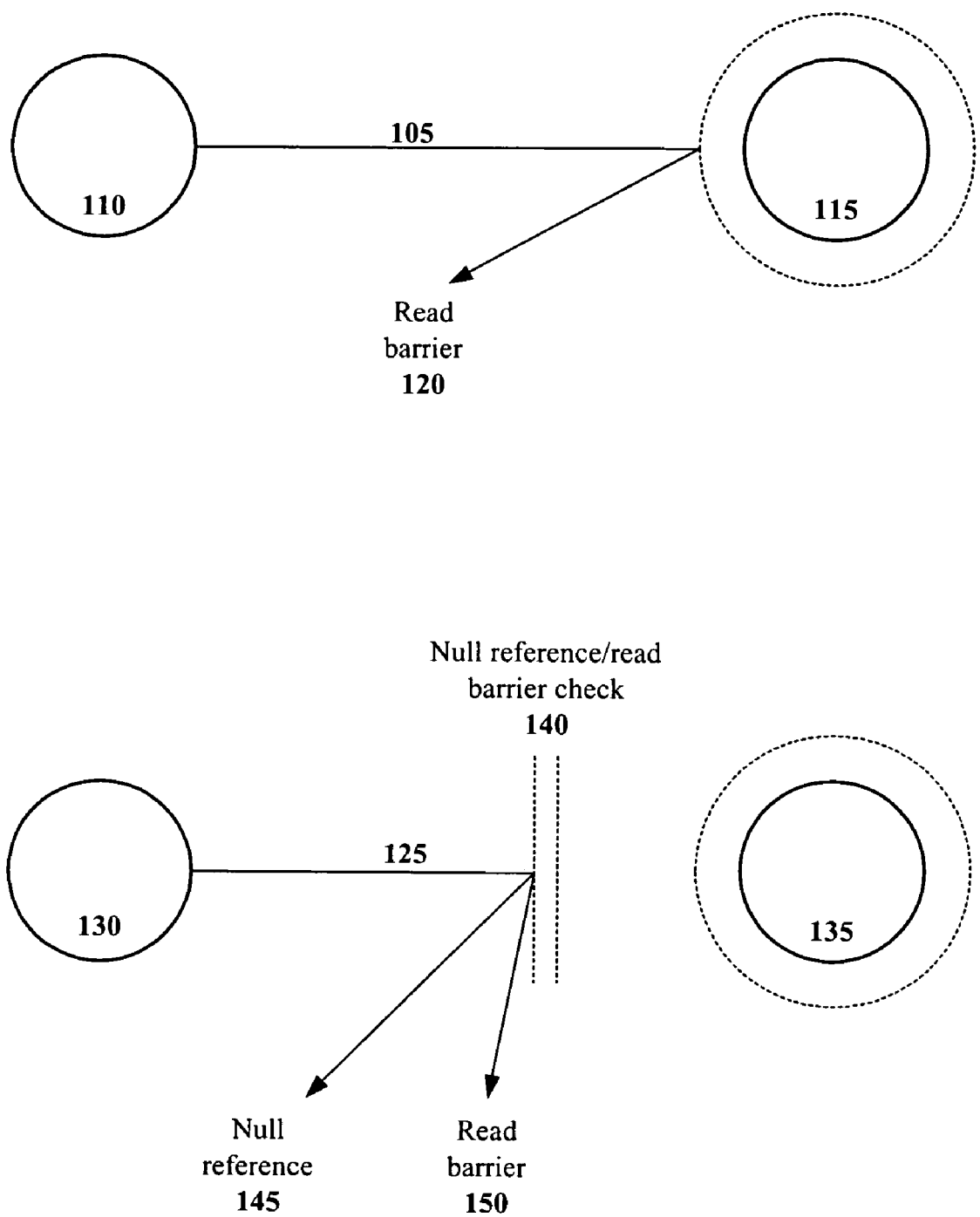
FIG. 1 illustrates an embodiment of a read barrier mechanism.

A method and apparatus are described for a program object read barrier.

According to an embodiment of the invention, a mechanism and process for implementing a read barrier is provided. A read barrier traps access to a program object. An object may be referred to as being guarded if access to it results in trapping. To implement read barriers, a computer system runtime guards all read accesses to an object with a check to determine whether an access touches a guarded object.

Under an embodiment of the invention, a control speculation feature is utilized to implement an object read barrier. An embodiment of the invention may be implemented in managed runtime environments (MRTEs), with such environments including the Java Virtual Machine or the .NET Common Language Runtime. The embodiment of the invention implements a read barrier without increasing overhead by combining the read barrier with a null reference check, which is generally required for a MRTE. An embodiment of the invention may be implemented in a compiler, including the Intel StarJIT dynamic compiler, a just-in-time compiler for both Java and .NET. A just-in-time (JIT) compiler is a program that dynamically converts program code into machine executable code or instructions at the request of the execution environment.

Under an embodiment of the invention, a processor architecture may support control speculation by providing two instructions, the instructions being a speculative load instruction (which may, for example, be designated as ld.s) and a speculation check instruction (which may, for example, be designated as chk.s). A processor utilized in an embodiment of the invention may include an Intel Itanium or Intel Itanium 2 processor. Under an embodiment of the invention, a processor does not generate a fault if a speculative load (ld.s) causes a hardware exception, such as a misaligned access exception. Instead, the processor invalidates the result of the load by making a particular setting, such as setting the NaT (not a thing) bit representing the 65th bit of an integer register for the Intel Itanium Processor Family (IPF) architecture. The speculation-check instruction (chk.s) checks the NaT bit and branches to a recovery code if the speculative load fails, indicated by the NaT bit being set. The control speculation feature generally allows a compiler to schedule a load speculatively above program branches upon which the load is control dependent. Under an embodiment of the invention, a control speculation feature or process is further used to implement read barriers in a managed runtime environment.

Under an embodiment of the invention, a read barrier check is implemented by using pointer swizzling and by combining the read barrier check with a null reference check, which is generally required in an MRTE. Pointer swizzling refers to converting external designations (names, array indices, or references) within a data structure into address pointers when the data structure is brought into memory. Under an embodiment of the invention, in order to guard an object the runtime (such as in the form of a system garbage collector) rewrites a pointer to the guarded object in some manner, such as setting the least-significant bit of its address. In this manner, a non-byte-sized access via the pointer will cause a misaligned access exception. An embodiment of the invention uses control speculative loads to defer and process misaligned access exceptions that then will result from the guarded object reads. Further, to avoid misaligned exceptions that are the result of guarded object writes, a compiler may precede each object write with an instruction that explicitly clears the least-significant bit of the object address.

An MRTE generally requires a load of an object data to raise a null reference exception if its base object reference is null. Under an embodiment of the invention, a compiler combines a null pointer check and a read barrier check into a single speculative load. The read barrier combined with the null pointer check thus avoids imposing additional overhead on program execution because run-time null pointer checks generally are already required for object accesses, unless a compiler can statically prove that the object reference is non-null.

A byte-size access would not cause a misaligned access exception without modification. Under an embodiment of the invention, read barriers may be implemented for byte-size object fields in a modified process. According to a first embodiment, a compiler may generate code that explicitly checks the least-significant bit of each object address to determine if the object is guarded, and, if so, the code executes the read barrier and adjusts the field address. This technique can also be used to implement read barrier checks for arrays of bytes. According to a second embodiment, a compiler may implements a byte-size object field access as a two-byte load, which then reads the required byte and the next byte if the byte field offset is even or the required byte and the previous byte if the byte field offset is odd. The compiler also generates an additional shift instruction to place the loaded byte into the least-significant byte of the register if the object offset is even and the memory layout is big endian (the most significant value in the sequence is stored at the lowest storage address), or if the object offset is odd and the memory layout is little endian (least significant value in the sequence is stored first). Under an embodiment of the invention, the extra shift instruction can be avoided if runtime pads the object so that byte-size fields are always aligned on the proper boundary.

FIG. 1 provides a figurative illustration of an embodiment of a read barrier mechanism. In this illustration, a first access request 105, such as from a first program object 110, is made for a second program object 115. In this general illustration, if the second program object 115 is guarded, the access request 105 is trapped, indicated by the read barrier result 120. Under an embodiment of the invention, a second read request 125 is made by a third program object 130 for a fourth program object 135. In this embodiment, a combined null reference and read barrier check 140 is utilized, which may provide the read barrier mechanism without imposing additional overhead when the null reference check is already required. There is then a determination whether a null reference condition 145 or a read barrier condition 150 exists.

Figure 2:
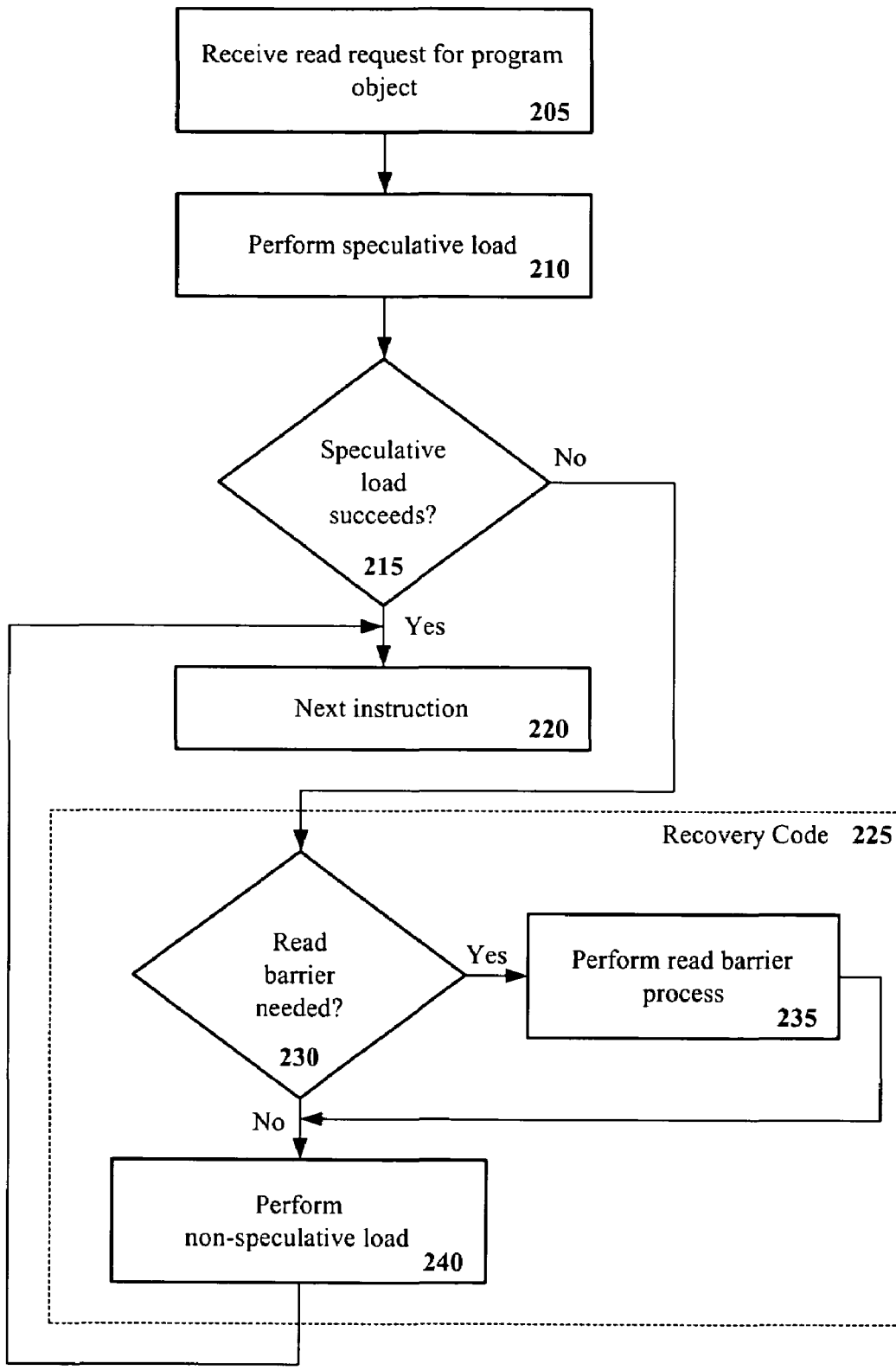
FIG. 2 is a flowchart illustrating an embodiment of a read barrier operation.

FIG. 2 is a flowchart illustrating an embodiment of a read barrier operation. In this example, a read request is received 205. In response to the read request, a speculative load is performed 210, followed by a speculation check 215. In this illustration, the use of the speculative load and the speculation check implements a read barrier check. If the speculative load succeeds, the process continues with the next instruction 220. If the speculative load fails, there is a branch to recovery code 225. In the recovery code, there is a determination whether a read barrier is needed 230. This determination may be made by determining whether, for example, the least significant bit of the address is set. If a read barrier is needed, indicating that a program object is guarded, a read barrier process is engaged 235. If a read barrier is not needed, a non-speculative load is performed 240 and there is a branch back to the next instruction 220.

FIG. 3 illustrates an embodiment of code 305 for non-byte-size access using control speculation. In FIG. 3, sample pseudo-code is provided to illustrate an example of reading an object field p.x, where p is an object reference and x is a field within this object. In this example, instruction I1 310 computes the address of the field x by adding the offset of x to the object's base reference (variable p). The read barrier check and field access are implemented as a speculative load, instruction I2 315, shown as the operation ld.s. This is followed by a speculation check, instruction I3 320. When an object reference for a guarded object has been swizzled, the speculative load will fail (for example, the target register's NaT bit may be set) and the instruction then transfers control to a recovery code 330. The recovery code 330 first checks if the object access requires a read barrier by testing the least-significant bit of the field address by instruction I4 335. If the least-significant bit is set, the last bit of the address will be cleared, as shown by instruction I5 340, and the read barrier in executed, instruction I6 345. Instruction I7 350 provides for re-executing the load non-speculatively. Instruction I8 355 then branches back to the main instruction sequence at NextInst 325. If the only reason for speculative load failure is access to a guarded object, i.e., if a processor is configured such that a speculative load does not fail on any serviceable fault (such as a dual transition lookaside buffer, or DTLB, miss) other than a misaligned access, then the recovery code can simply handle the read barrier without testing the least-significant bit of the address.

FIG. 4 illustrates an embodiment of a combination of a null pointer check and a read barrier check 405. In FIG. 4, sample pseudo-code is provided to illustrate an example of reading an object field p.x, where p is an object reference and x is a field within this object. In this example, instruction I1 410 computes the address of the field x by adding the offset of x to the object's base reference (variable p). A null reference check, read barrier check, and field access are implemented as a single speculative load, instruction I2 415, followed by speculation check, instruction I3 420. When an object reference is null or the guarded object reference has been swizzled, the speculative load fails and the check instruction transfers control to recovery code 430.

The recovery code compares the address of the load with the field offset, instruction I4 435, to check if the failure was due to a null reference. If the object base is null, the recovery code transfers the control to the code that raises null pointer exceptions, 440. If the object base is not null, the recovery code 430 proceeds to check if the object access requires a read barrier by testing the least-significant bit of the field address, instruction I6 445. If the least-significant bit is set, the last bit of the address will be cleared, instruction I7 450, and the read barrier in executed, instruction I8 455. Instruction I9 460 re-executes the load non-speculatively. Instruction I10 465 branches back to the main instruction sequence at NextInst 425. If a processor is configured such that a speculative load does not fail on a serviceable fault other than misalignment, the recovery code can perform a single test, which may be either the null pointer reference test or the guarded object access test, to determine the reason for the speculative load failure.

FIG. 5 illustrates an embodiment of a single byte access. In FIG. 5, a read barrier check for a single-byte field with an odd offset 505 is illustrated, assuming little-endian memory layout. Similar processes for even offset and big-endian memory layout combinations may also be illustrated. Instruction I1 510 computes the address of the byte preceding field x in the object layout by adding the offset of the field x minus one to the object's base reference. A speculative load, instruction I2 515, reads two bytes from this address. Because the offset of the field x is odd the value added to the object's base reference is even, so the load I2 causes misaligned access exception if and only if the object reference has been swizzled. Instruction I3 520 shifts the loaded value of the field x into the least significant byte of the register. Instruction I4 525 performs a speculation check. If the speculative load fails, the control is transferred to recovery code 535. The recovery code first checks if the object access requires a read barrier by testing the least-significant bit of the field address, instruction I5 540. If the least-significant bit is set, the code executes the read barrier, instruction I6 545. In this case variable t contains the address of field x rather than the address of the previous byte. Single-byte load instruction I7 550 non-speculatively reads the value of the field x and instruction I8 555 branches back to the main instruction sequence at label NextInst 530.

Figure 6:
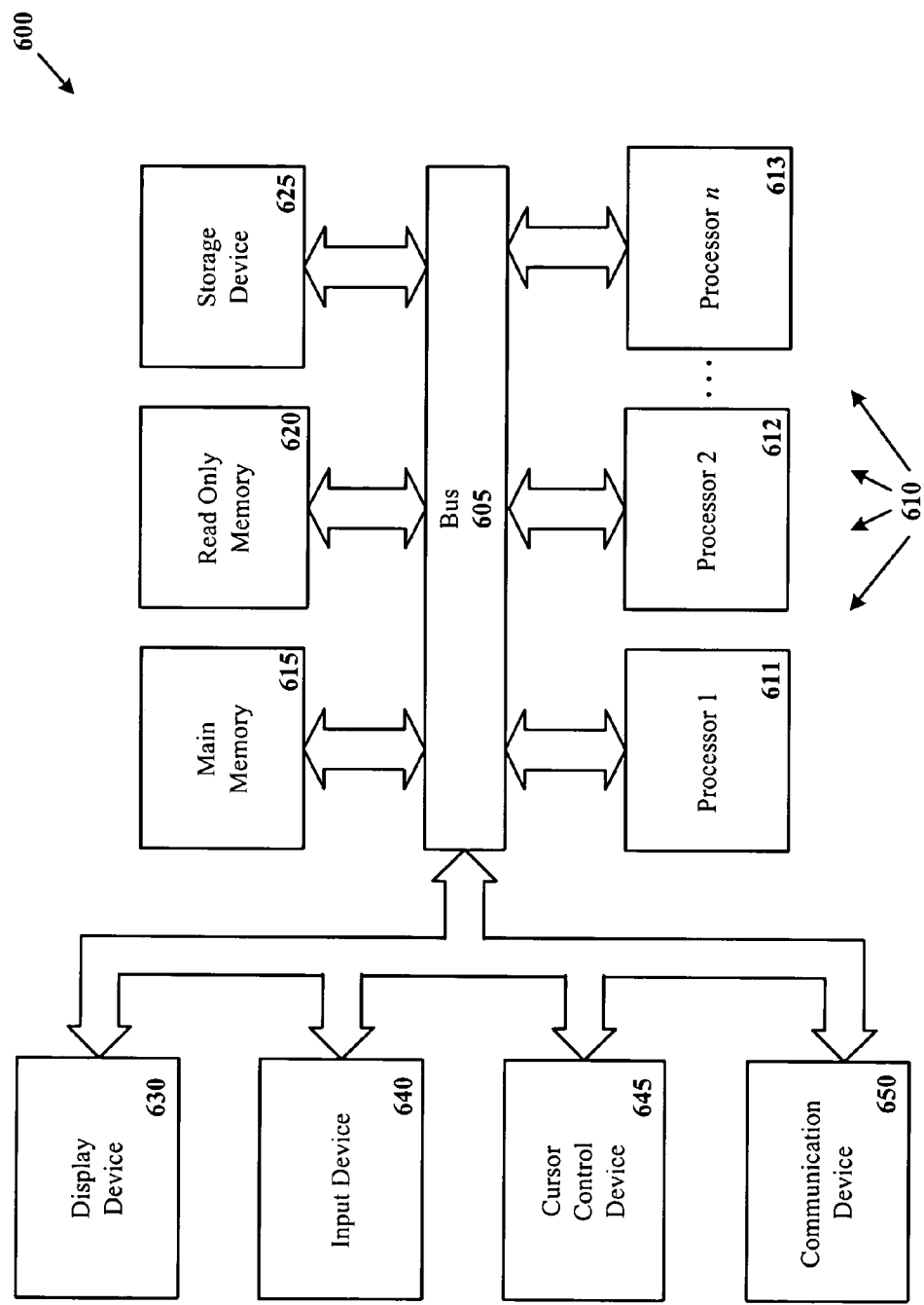
FIG. 6 illustrates an embodiment of a computer environment.

Techniques described here may be used in many different environments. FIG. 6 is block diagram of an exemplary computer system environment. Under an embodiment of the invention, a computer 600 comprises a bus 605 or other communication means for communicating information, and a processing means such as one or more processors 610 (shown as processor 1 611, processor 2 612, and continuing through processor n 613) coupled with the first bus 605 for processing information.

The computer 600 further comprises a random access memory (RAM) or other dynamic storage device as a main memory 615 for storing information and instructions to be executed by the processors 610. The instructions may include instructions related to a program compiler. Main memory 615 also may be used for storing temporary variables or other intermediate information during execution of instructions by the processors 610. The computer 600 also may comprise a read only memory (ROM) 620 and/or other static storage device for storing static information and instructions for the processor 610.

A data storage device 625 may also be coupled to the bus 605 of the computer 600 for storing information and instructions. The data storage device 625 may include a magnetic disk or optical disc and its corresponding drive, flash memory or other nonvolatile memory, or other memory device. Such elements may be combined together or may be separate components, and utilize parts of other elements of the computer 600. Under an embodiment of the invention, the data storage device 625 may include storage of a program compiler for use on the computer 600. The data storage device 625 may include storage of program code that includes one or more program object read barriers in operation.

The computer 600 may also be coupled via the bus 605 to a display device 630, such as a liquid crystal display (LCD) or other display technology, for displaying information to an end user. In some environments, the display device may be a touch-screen that is also utilized as at least a part of an input device. In some environments, display device 630 may be or may include an auditory device, such as a speaker for providing auditory information. An input device 640 may be coupled to the bus 605 for communicating information and/or command selections to the processor 610. In various implementations, input device 640 may be a keyboard, a keypad, a touch-screen and stylus, a voice-activated system, or other input device, or combinations of such devices. Another type of user input device that may be included is a cursor control device 645, such as a mouse, a trackball, or cursor direction keys for communicating direction information and command selections to processor 610 and for controlling cursor movement on display device 630.

A communication device 650 may also be coupled to the bus 605. Depending upon the particular implementation, the communication device 650 may include a transceiver, a wireless modem, a network interface card, or other interface device. The computer 600 may be linked to a network or to other devices using the communication device 650, which may include links to the Internet, a local area network, or another environment. In an embodiment of the invention, the communication device 650 may provide a link to a service provider over a network.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:

receiving an access request for a program object;

performing a combined check for a null reference and for a read barrier for the program object, the combined check including performing a speculative load in response to the read request and performing a speculation check for the speculative load; and if the speculative load is unsuccessful, performing a recovery operation including:
  determining if a read barrier is needed, wherein determining if the read barrier is Needed includes determining whether a least significant bit of an address Of the program object is set, and
  if a read barrier is needed, performing a read barrier process.

2. The method of claim 1, wherein the method is performed is performed in a managed runtime environment (MRTE).

3. The method of claim 1, wherein the access request is a single-byte access and further comprising implementing the access request as a multiple-byte access by reading one or more preceding or succeeding bytes of data.

4. A method comprising:
  receiving a subject code, the subject code including an access to a program object; and
  compiling the subject code into machine executable code, the machine executable code including a read baffler check for the program object, the read barrier check comprising:
    performing a speculative load to access the program object, wherein the speculative load operates as a combined check of a null reference and a check for the read barrier;
    performing a speculation check for the speculative load; and
    if the speculative load of the access fails, performing a recovery including:
      determining if a read barrier is needed;
      if a read barrier is needed, performing a read barrier process.

5. The method of claim 4, wherein the object code is compiled for a managed runtime environment (MRTE).

6. The method of claim 4, wherein the recovery comprises testing whether the failure of the speculative load results from an access to a program object that is guarded.

7. The method of claim 6, wherein testing whether the failure of the speculative load results from an access to a program object that is guarded comprises determining whether a bit for the address of the program object is set.

8. The method of claim 4, wherein the recovery comprises testing whether the failure of the speculative load results from a null reference.

9. A system comprising;
  a processor; and
  a compiler to be run by the processor, the compiler to:
    receive subject code, the subject code including an access to a program object; and
    compile the subject code into machine executable code, the machine executable code including a read baffler check for the program object, the read barrier check comprising:
      performing a speculative load to access to program object, wherein the speculative load operates as a combined check of a null reference and a check for the read barrier;
      performing a speculation check for the speculative load; and
      if the speculative load of the access fails, performing a recovery including:
        determining if a read barrier is needed;
        if a read barrier is needed, performing a read barrier process.

10. The system of claim 9, wherein compiling the object code comprises providing for setting a bit when a program object is guarded.

11. The system of claim 9, wherein the system comprises a managed runtime environment (MRTE).

12. The system of claim 9, wherein the recovery comprises testing whether the failure of the speculative load results from an access to a program object that is guarded.

13. The system of claim 12, wherein testing whether the failure of the speculative load results from an access to a program object that is guarded comprises determining whether a bit for the program object is set.

14. The system of claim 13, wherein the recovery comprises testing whether the failure of the speculative load results from a null reference.

15. A computer-readable storage medium having stored thereon data representing sequences of instructions that, when executed by a processor, cause the processor to perform operations comprising:
  receiving an access request for a program object;
  performing a combined check for a null reference and for a read baffler for the program object, the combined check including performing a speculative load in response to the read request and performing a speculation check for the speculative load; and
  if the combined check is affirmative, performing a recovery operation, the recovery operation including:
    determining if a read baffler is needed, wherein determining if the read barrier is needed includes determining whether a least significant bit of an address of the program object is set;
    if a read barrier is needed, performing a read barrier process.

16. The medium of claim 15, wherein the method is provided in a managed runtime environment (MRTE).

17. The medium of claim 15, wherein the access request is a single-byte access and wherein the instructions further comprise instructions comprising implementing the access request as a multiple-byte access by reading one or more preceding or succeeding bytes of data.

18. A computer-readable storage medium having stored thereon data representing sequences of instructions that, when executed by a processor, cause the processor to perform operations comprising:
  receiving subject code, the subject code including an access to a program object; and
  compiling the subject code into machine executable code, the machine executable code including a read baffler check for the program object, the read barrier check comprising:
    performing a speculative load to access the program object, wherein the speculative load operates as a combined check of a null reference and a check for the read barrier;
    performing a speculation check of the speculative load; and
    if the speculative load of the access fails, performing a recovery including:
      determining if a read barrier is needed;
      if a read barrier is needed, performing a read barrier process.

19. The medium of claim 18, wherein compiling the subject code comprises providing for setting a bit when a program object is guarded.

20. The medium of claim 18, wherein the subject code is compiled for a managed runtime environment (MRTE).

21. The medium of claim 18, wherein the recovery comprises testing whether the failure of the speculative load results from an access to a program object that is guarded.

22. The medium of claim 18, wherein testing whether the failure of the speculative load results from an access to a program object that is guarded comprises determining whether a bit for the program object is set.

23. The medium of claim 18, wherein the recovery comprises testing whether the failure of the speculative load results from a null reference.

* * * * *

UNITED STATES PATENT AND TRADEMARK OFFICE
CERTIFICATE OF CORRECTION

PATENT NO. : 7,512,930 B2  Page 1 of 1
APPLICATION NO. : 10/815397
DATED : March 31, 2009
INVENTOR(S) : Adl-Tabatabai et al.

It is certified that error appears in the above-identified patent and that said Letters Patent is hereby corrected as shown below:

In column 7, at line 19 delete, "baffler" and insert -- barrier --.

In column 7, at line 51 delete, "baffler" and insert -- barrier --.

In column 8, at line 19 delete, "baffler" and insert -- barrier --.

In column 8, at line 46 delete, "baffler" and insert -- barrier --.

Signed and Sealed this

Eighth Day of June, 2010

David J. Kappos
*Director of the United States Patent and Trademark Office*